UNITED STATES PATENT OFFICE.

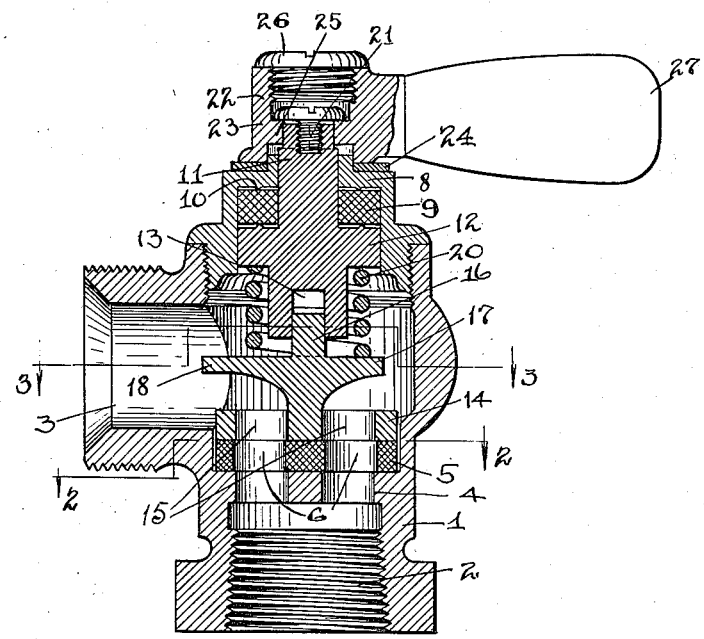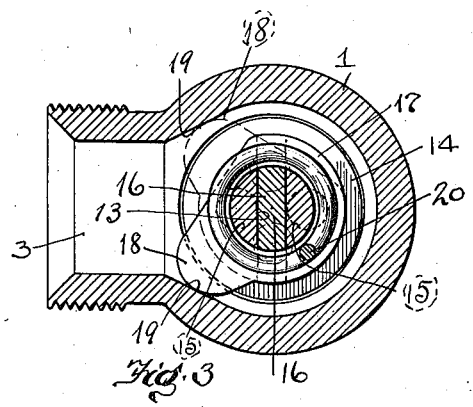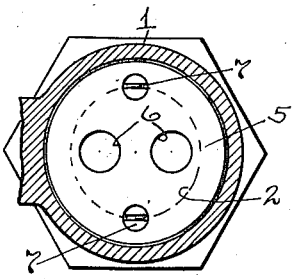

THEODORE H. SCHUTT, OF CLEVELAND, OHIO, ASSIGNOR TO THE BISHOP-BABCOCK-BECKER COMPANY, OF CLEVELAND, OHIO, A CORPORATION OF OHIO.

VALVE.

1,176,253.

Specification of Letters Patent. Patented Mar. 21, 1916.

Application filed December 10, 1914. Serial No. 876,500.

*To all whom it may concern:*

Be it known that I, THEODORE H. SCHUTT, a citizen of the United States, and a resident of Cleveland, county of Cuyahoga, and State of Ohio, have invented a new and useful Improvement in Valves, of which the following is a specification, the principle of the invention being herein explained and the best mode in which I have contemplated applying that principle, so as to distinguish it from other inventions.

The subject of the present invention is a valve adapted particularly for use in steam heating systems. The particular features of the present valve are the means for securing a rapid opening and closing and means for obviating the necessity for using the usual packing which must be provided in most valves in order to keep the same tight. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a vertical central section through the device showing certain of the parts in elevation; Fig. 2 is a transverse section on the line 2—2, Fig. 1; and Fig. 3 is a similar section on the line 3—3, Fig. 1.

The general construction of my device can best be seen in Fig. 1. There is a main body or casing 1 having a passage 2 therethrough and a lateral discharge opening 3 from such passage. In the inlet end of the casing there is provided an internally extending flange or shoulder 4 upon which is seated a disk 5 of relatively soft composition, that is softer than the metal with which it is in contact. This disk 5 is provided with one or more apertures 6 extending therethrough and is prevented from rotating by pins 7 engaging suitable apertures or slots in the flange 4.

The upper end of the casing 1 is provided with an inwardly extending flange or shoulder 8 against which is mounted a washer 9, the washer being maintained in a proper position against the shoulder by means of the rib 10 of the shoulder which engages in a correspondingly formed groove in the washer. Passing through the aperture in the upper end of the casing 1 is a valve stem 11 which is provided with an outwardly extending flange 12 adapted to contact the washer 9, being engaged with the same in the same manner as is the flange 8; namely, by means of a slot in the washer and a projection or rib on the flange 12. Below such flange 12 the stem is enlarged and is provided in its lower end with a transversely disposed slot 13.

Mounted upon the disk 5 is a valve in the form of a second disk 14 provided with one or more apertures 15 adapted to register in one position of the valve with the apertures 6 in the disk 5. The disk or valve 14 is provided with a tongue 16 engaging in the slot 13 in the stem 11 and being longitudinally but non-rotatably movable with respect thereto. Above the disk portion 14, the valve is flared in the form of a flange 17 provided at one side with an extension or finger 18 which is adapted to strike against stops 19 in the casing 1 upon rotation of the valve to such a position that it is fully closed or opened.

Interposed between the flanges 12 and 17 is a spring 20 which is adapted to maintain the disk 14 in close contact with the seat 5 and to also maintain the valve stem 11 in close contact with the washer 9, thus placing the latter under a vertical pressure and causing it to expand laterally, pressing against the stem 11 and preventing any leakage of steam or air from the top of the casing.

The internal portion of the stem 11 is hollowed out and threaded, adapting it to adjustably receive a screw 21 which maintains a cap 22 in contact with the top of the casing 1. It will be noticed that the cap 22 is provided with a downwardly extending sleeve 23 which contacts the upper surface of the casing 1, or, if desired, a washer 24 placed thereon, and the sleeve 23 is made long enough to allow a certain space between the top of the casing 1 and an internal flange 25 formed on the cap, which flange is engaged by the screw 21. In this way as this screw is tightened up to take up for wear or looseness in the washer 9, or as there is wear between the lower end of the cap and the upper end of the casing, this adjustment may be secured, which would be otherwise impossible if the flange 25 contacted the upper end of the casing. The top of the cap 22 is closed by a screw 26 and to this cap there may be attached, either integrally or otherwise, an operating handle 27.

If desired the washer 24 may be graduated to indicate the amount of opening which is given to the valve in the casing, and in that case there will preferably be a pointer or mark upon the cap 23 which will indicate in connection with the graduations upon the washer, the precise amount of opening given the valve.

The advantages of the present valve are the quick operation which is secured by a quarter turn of the valve stem and the provision of means for maintaining the valve casing tight without the use of the ordinary packing which is always a source of annoyance and must be replaced at frequent intervals. Another advantage is that any grit or dirt which lodges upon the upper surface of the valve seat is moved upon operation of the valve into the apertures through the seat and is thus permitted to escape, thus preventing the seat from being cut or scored by particles of sand and the like. In spite of the rapid opening and closing which may be secured when desired, the present valve is capable of a very sensitive and graduated operation as well, since the aperture in the seat and valve can be made to register to any desired amount.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a valve, the combination of a casing having a passage therethrough and two spaced shoulders therein, a disk of relative soft material mounted on one of said shoulders and having an aperture therein, a washer mounted upon the other of said shoulders, a valve stem pivotally mounted in said casing and having a flange bearing against such washer and a slot in the lower end, a valve having a tongue engaging in such slot in said stem and being provided with an aperture adapted, in one position of said valve, to register with such aperture in said disk, said valve being provided with an elongated portion extending into the outlet passage and adapted to contact the side of said casing to prevent movement of said valve beyond the open position, and resilient means adapted to maintain said valve in close contact with said disk.

2. In a valve, the combination of a casing having a passage therethrough, a valve pivotally mounted in said passage to control the same, said valve being provided with an elongated portion extending into the outlet passage, a valve stem for operating said valve, such elongated portion being adapted to contact the sides of said casing upon movement of said valve into either its closed or open position.

Signed by me, this first day of December, 1914.

THEODORE H. SCHUTT.

Attested by—
T. T. BURF,
W. J. RETZ.